United States Patent
Thomsen et al.

(10) Patent No.: US 10,144,041 B2
(45) Date of Patent: Dec. 4, 2018

(54) METHOD AND SYSTEM FOR FLUSHING A PIPE SYSTEM USING A FLUID IN A SUPERCRITICAL STATE

(71) Applicant: Ocean Team Group A/S, Esbjerg (DK)

(72) Inventors: Jens Peder Høg Thomsen, Varde (DK); Søren Leth, Esbjerg (DK); Martin Mose Stenstrup, Esberg (DK)

(73) Assignee: Ocean Team Group A/S, Esberg (DK)

( * ) Notice: Subject to any disclaimer, the term of this patent is extended or adjusted under 35 U.S.C. 154(b) by 0 days.

(21) Appl. No.: 14/910,709

(22) PCT Filed: Jul. 22, 2014

(86) PCT No.: PCT/DK2014/050230
§ 371 (c)(1),
(2) Date: Feb. 8, 2016

(87) PCT Pub. No.: WO2015/018419
PCT Pub. Date: Feb. 12, 2015

(65) Prior Publication Data
US 2016/0184871 A1    Jun. 30, 2016

(30) Foreign Application Priority Data

Aug. 8, 2013    (DK) .................... 2013 70438

(51) Int. Cl.
*B08B 9/027* (2006.01)
*B08B 9/032* (2006.01)
(Continued)

(52) U.S. Cl.
CPC .......... *B08B 9/0321* (2013.01); *B08B 7/0021* (2013.01); *B08B 9/032* (2013.01);
(Continued)

(58) Field of Classification Search
CPC ..... B08B 9/0321; B08B 7/0021; B08B 9/032; C01G 49/0036; H01F 1/01; C01P 2006/80; C01P 2002/30
(Continued)

(56) References Cited

U.S. PATENT DOCUMENTS 5,007,444 A    4/1991    Sundholm
5,306,350 A    4/1994    Hoy
(Continued)

FOREIGN PATENT DOCUMENTS

CN    101327488 A    12/2008
CN    201916889 U    8/2011
(Continued)

OTHER PUBLICATIONS

FineTubes.com (Available Sep. 2011 http://www.finetubes.co.uk/uploads/images/Control%20Lines.pdf).*

*Primary Examiner* — Nadine Norton
*Assistant Examiner* — Christopher Remavege
(74) *Attorney, Agent, or Firm* — James Creighton Wray; Meera P. Narasimhan (57) ABSTRACT

Use of supercritical CO2 for cleaning long, narrow pipes with a cross sectional area of less than 1000 square mm and a length of more than 500 meter. Cleaning is performed by adding a fluid to the lumen of the pipe (140); providing the fluid (2) in a supercritical state (6) inside the lumen; and subsequently, as a flushing step, while the fluid is in the supercritical state or in a liquid state, displacing the fluid (2) in the lumen of the pipe (140) and out of lumen of the pipe at a speed that causes a turbulent flow of the fluid, thereby flushing particles out of the lumen.

19 Claims, 2 Drawing Sheets

(51) Int. Cl.
*B08B 7/00* (2006.01)
*C01G 49/00* (2006.01)
*H01F 1/01* (2006.01)

(52) U.S. Cl.
CPC ........... *C01G 49/0036* (2013.01); *H01F 1/01* (2013.01); *C01P 2002/30* (2013.01); *C01P 2006/80* (2013.01)

(58) Field of Classification Search
USPC ........ 134/10, 11, 12, 14, 22.1, 22.11, 22.12, 134/22.18
See application file for complete search history.

(56) References Cited

U.S. PATENT DOCUMENTS

| | | | | |
|---|---|---|---|---|
| 5,375,426 | A * | 12/1994 | Burgener | F25B 45/00 62/292 |
| 6,454,871 | B1 * | 9/2002 | Labib | A61C 1/0076 134/22.12 |
| 8,517,097 | B2 * | 8/2013 | Segerstrom | F17D 1/005 137/13 |
| 2003/0000556 | A1 | 1/2003 | Cotte | |
| 2003/0094419 | A1 * | 5/2003 | Vickio, Jr. | B08B 9/0323 210/741 |
| 2005/0028927 | A1 | 2/2005 | Basceri | |
| 2008/0006291 | A1 | 1/2008 | Watanabe | |
| 2009/0107523 | A1 | 4/2009 | Zorn | |
| 2013/0074943 | A1 * | 3/2013 | Cloeter | B01F 5/0451 137/13 |

FOREIGN PATENT DOCUMENTS

| | | | |
|---|---|---|---|
| DE | 20113516 U1 | 1/2003 | |
| EP | 2151377 A2 | 2/2010 | |
| FR | 2918167 A1 * | 1/2009 | ........... B08B 7/0021 |
| GB | 2323421 A | 9/1998 | |
| JP | 10258019 A | 9/1998 | |
| JP | 2006059683 A | 3/2006 | |
| WO | 03064065 A1 | 8/2003 | |
| WO | 03103863 A1 | 12/2003 | |

* cited by examiner

METHOD AND SYSTEM FOR FLUSHING A PIPE SYSTEM USING A FLUID IN A SUPERCRITICAL STATE

This application claims the benefit of Danish Application No. PA 2013 70438 filed Aug. 8, 2013 and PCT/DK2014/050230 filed Jul. 22, 2014, International Publication No. WO 2015/018419, which are hereby incorporated by reference in their entirety as if fully set forth herein.

FIELD OF THE INVENTION

The present invention relates to a method for cleaning of pipes, in particular by flushing the lumen of long, thin pipes.

BACKGROUND OF THE INVENTION

Pipe system for carrying a medium through their inside will over time accumulate unwanted materials or impurities on its walls, which will reduce its fluid transport capacity. Likewise, such unwanted materials or impurities will or can contaminate the fluid to be transported through the pipe system, for example oil, which in turn can be detrimental for the functioning of valves that are connected to the pipes. Such unwanted materials or impurities will therefore result in reduced operational capacity either directly through reduced flow or indirectly due to the efforts, time and resources required to maintain the pipe system and attached valves at an acceptable level of cleanliness.

Particular pipe systems are hydraulic systems such as so called umbilical cords used in offshore industry. Installations can vary in length, for example several kilometers long, and connect equipment placed at industrial sites, offshore installations, or sub-sea installations, further increasing the complexity of operating and maintaining the installation at a certain and required level of cleanliness.

In the particular case where the hydraulic pipe system uses an oil-based fluid, the impurities or dirt that accumulated on the inside of the hydraulic pipe system is usually wax or grease. Wax or grease is typically also present in new pipes or coils and should be removed before installation. Otherwise, impurities from the fluid, for example oil, being conducted through the pipe will stick to the wax or grease. The impurities may also be transported into valves used in deep-sea installations with the risk of malfunctioning, why a proper cleaning before installation of the pipes in such systems is important.

In order to clean pipe systems, it has been proposed to use turbulent flow in such pipes with a cleaning and flushing liquid. The turbulent flow assists in loosening contaminants that adhere to the inner wall of the pipes and flush away the contaminants. In the UK patent application GB2323421 by Thomsen, assigned to Ocean Team Scandinavia, a system is disclosed with fluid pipes are cleaned with a pulsated flow. In order to obtain a turbulent flow, a Reynolds number of at least 2300 or at least 3000 is mentioned When narrow pipe systems get very long, the pressure drop of the cleaning fluid throughout the pipe results in loss of turbulent flow, because the speed of the flow cannot be kept high enough. This problem is discussed in U.S. Pat. No. 5,007,444 by Sundholm; the pressure drop in pipes that are longer than 200 m and with a narrow lumen of 10 mm prevent a flushing speed that creates a turbulent flow, because the pressure required at the entrance of the tube to compensate for the pressure loss along the pipe and for create the necessary flow speed would exceed the pressure that the pipes typically withstand. As a solution to this problem. U.S. Pat. No. 5,007,444 proposes filling the pipe system with flushing liquid as well as gas such that number of portions of flushing liquid in the pipe is separated by gas portions. The gas in the alternating columns of oil and gas is compressed for subsequent expansion when a valve is opened in order to create a forceful flushing pulse through the pipe system.

However, despite various suggestions for long, narrow pipes, proper cleaning is a problem that is still not solved in a satisfactory way, such that there is a need for further improvement in the art.

Often, oil is used as a cleaning and flushing liquid. For cleaning and flushing of pipe systems, heat exchangers, condensers and catalysers, liquid carbon dioxide (LCO2) or supercritical carbon dioxide (SCCO2) has been proposed in German utility model DE20113516U1 by Kipp. As illustrated in the figures of DE20113516U1, LCO2 or SCCO2 is led into the bottom of a heat exchanger and extracted through a top valve before being filtered as gas and recirculated. In DE20113516U1, no details are given with respect to flow speed or pressure other than the pressure and temperature necessary to keep the carbon dioxide (CO2) in a liquid or supercritical state. It is explained that the LCO2 and the SCCO2 would loosen the contamination from the inner walls. Although, the description states that contaminants are removed from the system and then filtered, no concrete considerations appear to have been taken whether the contaminants can actually be removed from the system in practice. Calculations in this regard will be explained in more detail below, indicating that the system in DE20113516U1 cannot to be expected to work in practice.

All in all there is still a need for improvements in the field of pipe cleaning.

Rinsing cavities with supercritical CO2 is disclosed in US2009/0107523 by Zorn. CO2 gas as a flushing in submarines is disclosed in European patent application EP2151377 by Krummerich et al. Use of hydrocarbon fluids for cleaning a chemical or hydrocarbon processing plant is disclosed in WO2003/103863. Substrate cleaning with SCCO2 is disclosed in WO2003/046065 by Bertram et al.

OBJECT OF THE INVENTION

The object of the present invention is to provide a method or a system that is capable of cleaning and flushing a long pipe system, for example longer than 500 meters or longer than 1000 meters, and with a relatively narrow inner pipe diameter, for example less than 10 mm or less than 8 mm.

DESCRIPTION OF THE INVENTION

Pipes for long pipe systems, often, contain wax or grease from the extrusion process and are then, typically, pre-flushed with hydraulic oil by the manufacturer in order to clean the lumen, especially, remove particulate contaminants from inside the lumen of the pipe. The pre-flushing oil is filtered, and, once the filtered oil is clean, the pipe is declared as clean. However, study of the problem has revealed that the pre-flush with clean oil leads to a laminar flow through the tube and is not sufficiently capable to remove such contamination from the wall of the pipe during the pre-flushing. This implies the risk for the particulate contaminants to be release from the wall of the lumen at a later stage during normal operation, which, in turn, can cause damage to valves and other equipment connected to the pipe.

In order to solve the above problems and objective, the inventor has performed studies and experiments with CO2 in supercritical state (SCCO2) and liquid state (LCO2) when used for cleaning pipes that are part of pipe systems, the pipe systems optionally including further elements, such as valves and connectors, in addition to the pipe. CO2 has a supercritical temperature of $T_{SC}=304.1$ K (31° C.) and a supercritical pressure of $P_{SC}=72.8$ atm. It has been found that the fall speed of particles in SCCO2 is very high due to the very low viscosity of the SCCO2, such that an upwards vertical flow through a heat exchanger, as illustrated in DE20113516U1, is highly unlikely to remove any particles from the system. For example, the fall speed of a particle with a diameter of 0.1 mm in LCO2 has been found to be in the order of 100 mm/sec, which is a factor of more than 30 larger than in flush oil. In SCCO2, due to the tenfold lower viscosity, it would be even an order of magnitude larger. The drag coefficient, which indicates the fluid's ability to drag particles along during displacement of the liquid is more than a factor of 1000 lower in LCO2 than in flushing oil, because the viscosity of LCO2 is more than an order of magnitude lower than for flushing oil (15 cSt). For SCCO2, the viscosity is more than two orders of magnitude lower, leading to an even lower drag coefficient.

Thus, at first sight, LCO2 and especially SCCO2, despite being useful for dissolving hydrocarbons in pipes, appear not to be a useful flushing liquid for cleaning pipe systems in which particles have accumulated. Especially, in the system of DE20113516U1, the particles are likely to drop to the bottom of the heat exchanger against the flow of the SCCO2 due to the low viscosity of the SCCO2. For this reason, the system as proposed in DE20113516U1 appears possibly useful for contaminants that can be dissolved by SCCO2 or LCO2, but no removal of particles from the heat exchanger is to be expected in practice when studying the problem in greater detail. Thus, DE20113516U1 is not likely to be regarded as a system useful for flushing long, narrow pipe systems which contain particles.

Despite this apparently negative expectation in relation to the usefulness of using, particularly, SCCO2 for cleaning pipe systems, the inventors have developed a technical solution where SCCO2 can be used for such cleaning as well as flushing of long, narrow pipe systems when adjusting the parameters of temperature, pressure and flushing speed appropriately. This will be explained in the following.

Accordingly, the objective is solved by a cleaning method and system as explained in the following.

The method takes offset in flushing a lumen of a long pipe with a first end and a second end and a narrow lumen between the first and second end. In the following, it is understood that the fluid enters the first end and flows from the first end to the second end, where it leaves the pipe.

The term long and narrow pipe is to be understood as a pipe with length and an inner cross sectional dimension, for example lumen diameter, the ratio of which is at least 50,000. For example, the pipe a length of more than 500 meter or more than 1000 m or more than 2000 meter and the lumen has a cross sectional area of less than 100 square mm, less than 75 square mm or less than 50 square mm, or less than 30 square mm. For pipes with a lumen having circular cross section, the diameter is less than 12 or 10 or 8 or 6 mm. For a noncircular lumen, the cross sectional dimension is an equivalent diameter calculated as twice the square root of the ratio between the cross sectional area and the number Pi=3.14.

For example, the lumen through the pipe has a constant cross section, for example constant diameter.

The method comprises as a first step adding a fluid to the lumen of the pipe at the first end of the pipe. For example, the fluid is a clean-filtered gas or liquid or a fluid in a supercritical state. CO2 is an advantageous example because it is environmentally friendly and non-explosive. The fluid is provided in a supercritical state inside the lumen, for example because it has been added to the lumen already in a supercritical state through the first end of the pipe. Alternatively, the fluid is added to the lumen in gas state and then brought into the supercritical state by changing the pressure and/or temperature. Alternatively, the fluid is added to the lumen at the first end of the pipe in liquid state and then brought into the supercritical state by adjusting the temperature and/or pressure.

While in the supercritical state, the fluid is performing a cleaning action. For example, SCCO2 dissolves hydrocarbons, such as grease and wax, and other chemicals from the inner wall of the pipe. Also, the stress on the inner wall of the pipe may cause particular material to be loosened such that it is accumulated freely flowing in the fluid inside the lumen.

In order to remove the particular material from the lumen, a flushing step has to be performed. This is a critical issue as already discussed above, because the pressure drop in the lumen along the long pipe may prevent achievement of a flow speed sufficiently high for turbulent flow. A laminar flow, when using SCCO2 or LCO2 would not remove the particles in the pipe but keep them loosely accumulated on the walls of the pipe, for example the bottom of the pipe, particularly, if the flow is not vertically downwards. For example, the latter conditions are met when pipes are cleaned before installation while they are provided in coils.

However, with the fluid in the supercritical state, a flushing can be performed at a speed that causes a drag of the particles along the pipe and a further loosening of particles from the walls of the lumen, when the fluid is displaced in the lumen of the pipe at a speed that causes a turbulent flow of the fluid, thereby flushing particles along and out of the lumen. For CO2, the supercritical state has proven to be possible to be used as a flushing fluid, but also the liquid state can be used. For other fluids, as will be mentioned below, the supercritical state is generally preferred due to the low viscosity when in the supercritical state, which implies a relatively small pressure drop along the pipe. Furthermore, in the case of the fluid being CO2, the supercritical state of CO2 (SCCO2), as compared to the liquid state of CO2 (LCO2), is more robust with respect to keeping the state despite minor changes in temperature and pressure, as it can be provided at temperatures and pressure far from the supercritical temperature/pressure point.

For LCO2, turbulent flow is expected for a Reynolds number of at least 2500, for example at least 3000. This number is very much like the corresponding estimate for flushing oil. For SCCO2, the Reynolds number for turbulent flow is about ten times higher, for example at least 17,000 or at least 20,000 or thus at least 25,000. These numbers also apply for other supercritical fluids that are mentioned below.

It is pointed out that short chained oils, grease and wax are dissolved in LCO2 or in SCCO2 at a pressure of 200 Bars. In some embodiments, for removing such oils from the lumen, the pressure is adjusted to at least this value in the lumen at the second end in order to make sure that all oil is dissolved along the pipe; thus, the pressure at the first end is selected higher than 200 Bars such that the pressure at the second end of the tube is still at least 200 Bars. This high pressure can be used during the turbulent flushing such that oil as well as particulate material is removed from the lumen.

Alternatively, the lumen is flushed at this pressure first above 200 Bars in order to remove oils, after which the turbulent flushing is performed at a lower pressure where particular material is removed from the lumen. If oils have been removed in a first step at this high pressure, the pressure is not so critical for the subsequent turbulent flushing.

For example, LCO2 is used at pressure above 200 Bars to remove oil and grease and wax, after which the temperature is raised to obtain SCCO2, and the SCCO2 is used to remove particles.

Through investigation, it has been found that turbulent flow is achieved at a speed of the fluids through the lumen of at least 0.5 m/sec, for example at least 1 m/sec or at least 1.5 m/sec or at least 2 m/sec. However, this also depends on the cross section in the tube, and turbulent speed can potentially be achieved with speed as low as 0.2 or 0.3 m/sec.

In case that the SCCO2 is filled into a lumen of a tube that is long and extends into sea water, the temperature of the sea water would result in a temperature drop inside the tube which may cause a change of the supercritical state into a liquid state. As there is an interest of keeping the CO2 in a supercritical state for relatively long inside the lumen, the speed should of the CO2 not become too low. A speed of at least 1.5 m/sec has been found to be a good selection in such cases, although the speed may be lower or higher in dependence of the surrounding conditions, for example cold sea water, which influence the temperature drop. The advantage of SCCO2 as compared to LCO2 is the lower viscosity, which allows a higher flow rate at relatively low pressure drop through the tube. The higher flow rate is a good measure against early temperature decrease underneath the critical temperature.

In order to get a proper displacement of particles inside the lumen, the speed should be higher than the particle fall speed in the fluid. Particles may have different sizes from a few microns to several 100 microns in diameter; a good approximation has been found in the fluid speed through the lumen to be higher that the fall speed of a 15 micron sized particles in the fluid.

For example, the cross sectional area of the lumen is 30 square mm and the length more than 1000 m; the speed of the CO2 through the pipe during the flushing step is at least 0.5 m/sec, optionally at least 1.5 m/sec. and the Reynolds number is at least 2,500 if the CO2 is in the liquid state and at least 17,000, optionally at least 25,000, if the CO2 is in the supercritical state.

In order to assure that the CO2 is in the supercritical state in the entire lumen from the first end to the second end, it must be assured that the pressure at the second end is at least $P_{SC}$ which is around 74 Bar at atmospheric pressure. Taking the pressure drop through the lumen into account, the pressure necessary at the first end has to be estimated; for example the pressure of the fluid at the first end or the second end is higher than 200 bars. If the length is 3000 meter, the pressure should be higher than 300 bars at the first end. In order for the system to be robust against slight variations in pressure and temperature, it is advantageous that the minimum temperature and the minimum pressure inside the lumen, also at the second end, are well above the supercritical temperature and pressure.

In some embodiment, the fluid is flowing into the lumen at the first end and exits the lumen at the second end, and the fluid is recirculated through a particle filter between the second end and the first end. The fluid traverses the particle filter in gas state or in supercritical state. Optionally, the fluid is continuously recirculated through the lumen and the filter, and the pressure is alternated between a low value below the supercritical pressure and a high value above the supercritical pressure for alternating between liquid state and supercritical state of the fluid in the lumen.

For example, the pipe is provided in a liquid bath while the fluid is inside the lumen; the temperature of the liquid bath is controlled to above the supercritical temperature of the fluid before the flushing and optionally during the flushing, in case that the fluid is used for flushing while in the supercritical state. Especially for pipes before offshore installation, while the pipes are still wound into coils, the coil can be submersed into a temperature controlled liquid bath for assuring proper control of the fluid state inside the lumen. Other types of heating or cooling systems may be applied in addition or alternatively. For example, a heating or cooling heat exchanger may be added to the first or the second end of the pipe. Alternatively, or in addition, heating means may be provided around the pipe at one or more locations for heating the fluid inside lumen.

For example, the pipe is an oil pipe, typically flexible oil pipe. Such flexible pipes connecting offshore installations with ships or other types of vessels are often called umbilical. A specific example of an oil pipe is a so-called control line, used for control of valves in petrochemical transport pipes. Thus, in some embodiment, the described cleaning method is used in pipe systems that are at least partly under the surface of the sea or at underground level.

The cross section of the pipe system is in one simple case circular with a given diameter. Alternatively, the cross section can be shaped as an ellipse, a curved free form, or a polygon or even a combination thereof. The cross section can be uniform or nonuniform along the whole length of the pipe, although, typically, it will be uniform. The pipe can be straight or curved, for example having one or more bends. For example, the pipe is made of metal, such as stainless steel or nickel alloys, or a polymer/metal combination.

Optionally, it has a uniform circular cross section with an inner diameter of about less than 6 mm, for example less than 4 mm, and a length of at least 2,000 m, for example at least 3,000 m.

For example the pipe has a bend such that the first and the second ends are close to each other, for example within a few meters distance. Alternatively, the first end and the second end are far from each other; an example is a first end above sea level and a second end far below sea surface or even underground. When using CO2, the used CO2 can be released from the second end into the sea water without harm to the environment. In this case, there is no recirculation, and no filtering during recirculation needs be performed, which simplifies the flushing system. Especially, in connection with control lines, the flushing of the control line can be performed while the valves that are controlled by the pressure in the control line are still functioning routinely in connection with oil or gas transport lines. A special release valve may be used controlled pressurised release of CO2 into the sea water.

In one process according to the invention, the fluid is brought from the supercritical state to the liquid state by lowering the temperature and/or the pressure of the fluid from a value above to a value below the supercritical temperature $T_{SC}$ and supercritical pressure $P_{SC}$, respectively.

For example, the displacement of the fluid in the pipe system is done by adding more fluid to the pipe system at the first end and/or removing fluid from the pipe system at the second end. Alternatively, the displacement of the fluid can be accomplished by inserting an object, a so called shuttle, in the pipe and translocate the shuttle at least partially or fully in the pipe system. Such shuttle is translocated together with the fluid flowing through the pipe.

To enable the increase in pressure, means for increasing the pressure is provided, for example a compressor or pump connected to the pipe system by fitting means.

Although, as explained, CO2 is advantageous in being environmentally safe and not explosive, other fluids can in principle be used as a substitute for CO2. However, typically, other fluids than nitrogen ($N_2$) would be used. Examples of such fluids are organic fluids with at least two of carbon, oxygen and hydrogen atoms. Examples are given in the following:

Propane, $C_3H_8$, that has a $T_{SC}$=369.8 K (96° C.) and a $P_{SC}$=41.9 atm. This embodiment provides a fluid as a solvent suitable for being in a supercritical state, entering into and out of a supercritical state around a temperature just above most industrial applications with operating temperatures just below the boiling point of water.

Ethane, $C_2H_6$, that has a $T_{SC}$=305.3 K (32° C.) and a $P_{SC}$=48.1 atm. This embodiment provides a fluid as a solvent suitable for being in a supercritical state, entering into and out of a supercritical state around a temperature just above natural air and sea temperatures, but with a lower pressure than for example carbon dioxide.

Ethylene, $C_2H_4$, that has a $T_{SC}$=282.4 K (9° C.) and a $P_{SC}$=49.7 atm. This embodiment provides a fluid as a solvent suitable for being in a supercritical state, entering into and out of a supercritical state around a temperature just above the freezing point of water.

Methane, $CH_4$, that has a $T_{SC}$ 190.4 K (−82.75° C.) and a $P_{SC}$=45.4 atm. This embodiment provides a fluid as a solvent suitable for being in a supercritical state, entering into and out of a supercritical state around a temperature just above most industrial applications with operating temperatures at sub-zero temperatures such as cryogenic applications.

Ethanol, $C_2H_5OH$, that has a $T_{SC}$=513.9 K (241° C.) and a $P_{SC}$=60.6 atm. This embodiment provides a fluid as a solvent suitable for being in a supercritical state, entering into and out of a supercritical state around a temperature just above most industrial applications with operating temperatures well about the boiling point of water such as heating systems and engines.

Methanol, $CH_3OH$, that has a $T_{SC}$=512.6K (239° C.) and a $P_{SC}$=79.8 atm. Thereby this embodiment provides a fluid as a solvent suitable for being in a supercritical state, entering into and out of a supercritical state around a temperature just above most industrial applications with operating temperatures well about the boiling point of water such as heating systems and engines, but with a higher pressure than required for Ethanol.

For example, a flushing system is provided for flushing a pipe system with a fluid in the direction from an inlet point of the pipe system to a return point of the pipe system, the inlet point being fluid-flow connected to the first end of the pipe and the return point being fluid flow connected to the second end of the pipe such that the pipe is a part of the pipe system, the pipe system potentially comprising further elements, such as connectors and valves. The system has the potential for being used for recirculation of the fluid through the pipe. The system comprises the following elements:

a compressor for varying the pressure of the fluid and a heater for controlling the temperature of the fluid before the inlet point and a flush tank for receiving the return fluid from the pipe system and a reservoir for storing the fluid and for feeding the compressor after the return point connection means at the inlet point and the outlet point for connecting with the pipe system so that the fluid can enter the pipe system at the inlet point, flow through the pipe in the pipe system, and return to the flushing system at the return point before a potential recirculation, and with connectors between the elements.

Thereby the fluid can exist in the lumen of the pipe in the pipe system in a supercritical state and at least part of the fluid can transit from the supercritical state to a liquid state or the gas state, and the fluid can be displaced in the lumen of the pipe.

It is understood that the term compressor is a pump or any other means for increasing the pressure. Similarly the heater for controlling the temperature can include a cooling element to adjust the temperature.

According to an embodiment of the invention, the flushing system further includes a system of sampling filters placed after the return point of the pipe system and configured for sampling the returning fluid for impurities and dirt cleaned from the pipe system.

According to further embodiments of the invention, the flush tank has a cooler for adjusting the temperature of the returning fluid before processing the fluid and recirculation of the fluid. In a particular embodiment, the cooler is configured according to size, i.e. the volume, of the flush tank and the particular fluid's critical temperature to ensure that the fluid in the flush tank can be held at a temperature below the critical temperature of the particular fluid. The person skilled in the art will easily be able to reconfigure the cooler or add or remove cooling elements according to experience with the actual operation of the flushing system.

According to an embodiment of the invention, the flushing system further comprises at least one sampling filter or a system of sampling filters arranged between the return point and the flush tank. Thereby, the flushing system enables measurements of the cleanliness of the returning fluid and thereby implicitly obtaining information about the cleanliness of the pipe system.

According to an embodiment of the invention, the flushing system comprises at least one expansion valve before the inlet point and/or at least one expansion valve after the return point.

According to an embodiment of the invention, the flushing system comprises a controller with communication means to at least one of the units disclosed.

DESCRIPTION OF THE DRAWING

This invention will be described in relation to the drawings, where.

DETAILED DESCRIPTION OF THE INVENTION

Figure 1:
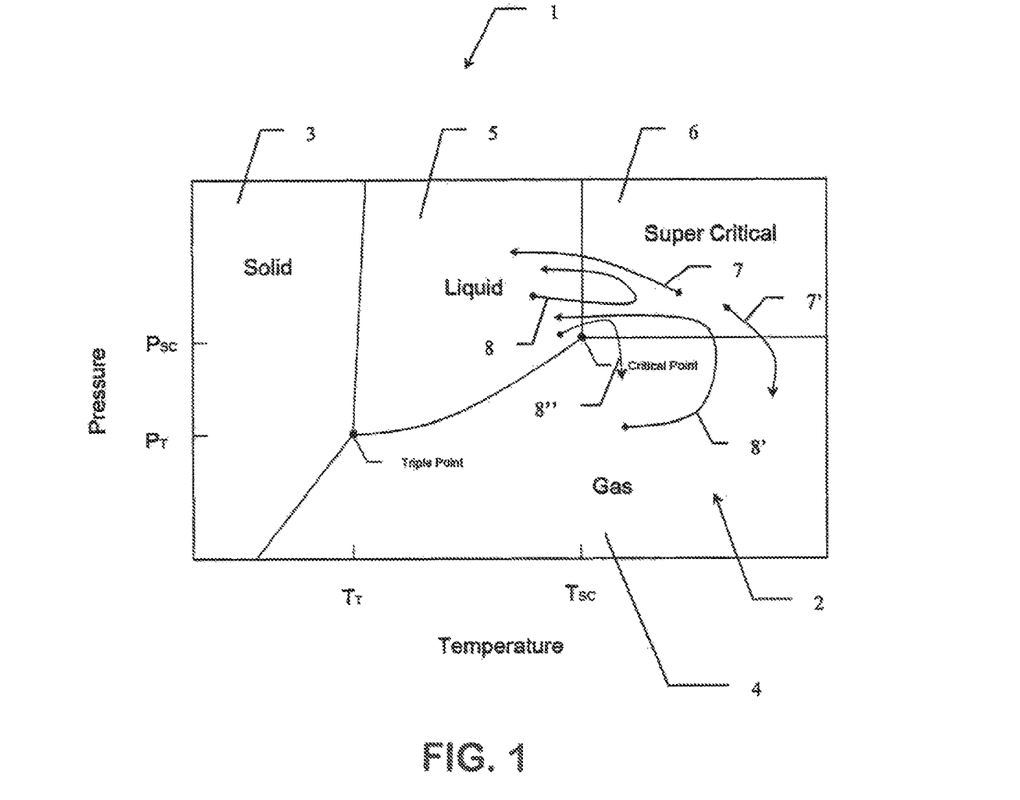
FIG. 1 shows a state diagram of a fluid.

FIG. 1 shows a temperature-pressure (TP) state diagram 1 of a fluid 2. The fluid 2 can be in a solid state 3, a gas state 4, a liquid state 5 or a supercritical state 6. The intersection between the solids state 3, the gas state 4 and the liquid state 5 defines the triple point at a temperature $T_T$ and a pressure $P_T$. Likewise the intersection between the gas state 3, the liquid state 5 and the supercritical state 6 defines the critical point at a temperature $T_{SC}$ and a pressure $P_{SC}$.

Figure 2:
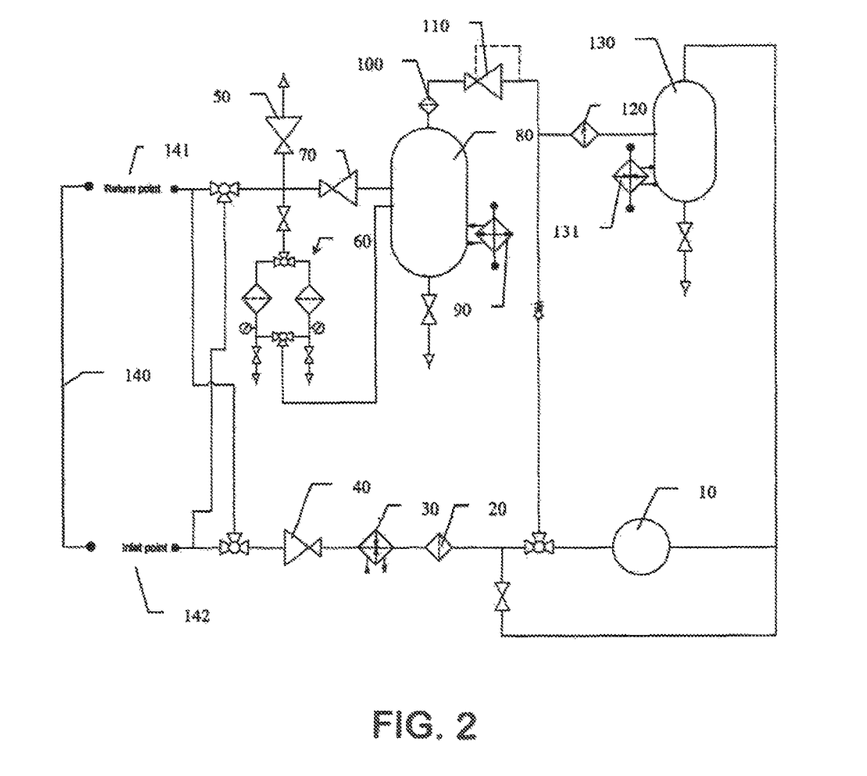
FIG. 2 shows a diagram of a flushing system for flushing a pipe system with a fluid such as $CO_2$ in a supercritical state.

FIG. 2 shows a diagram of an embodiment of a flushing system 9 for cleaning a pipe system 140 with $CO_2$ in a supercritical state and flushing the pipe system 140 with CO2 in supercritical state and possibly liquid state. Supercritical and liquid flushing unit 9 is disclosed encompassing a compressor 10 for compressing a fluid such as $CO_2$ from 65 bar to 600 bar and thereby bringing the fluid from a gas phase to a liquid phase or supercritical phase. The compressor 10 is connected by a stainless steel pipe to a filter 20 for filtering out contaminants within the system and thereby obtaining a sufficient level of cleanliness. The filter 20 is connected by a stainless steel pipe to a heater unit 30 for controlling the temperature. The heater unit 30 is connected by a stainless steel pipe to an expansion valve 40 for regulating the fluid in the system and thereby controlling various flow options. The expansion valve 40 is connected by a stainless steel pipe to an inlet point of a pipe system 140 which needs to be flushed. The pipe system 140 comprises a long, narrow pipe and possible connectors and valves as far as necessary and convenient. Downstream of the pipe system 140, a return point connects to the flushing unit 9.

For example, the pipe system 140 comprises a pipe with a length of more than 500 m, for example at least 1000, at least 2000, or at least 3000 m, or even at least 4000 m, such as in the order of 5000 m, and with a lumen having a cross section of less than 75 or less than 50 or less than 30 square mm.

A second expansion valve 50 is provided for degassing the system 9 and thereby being able to empty out the flushed pipe system 140. The expansion valve 50 is connected by a stainless steel pipe to a filter sampling system 60, from which $CO_2$ samples can be taken out for measuring the level of cleanliness within the flushed pipe system 140. The filter sampling system 60 is connected by a stainless steel pipe to a third expansion valve 70 used for expanding the fluid to a flush tank 80, which receives the expanded $CO_2$ from 75 bar to 70 bar and a temperature of 108 degrees Celsius to 28.7 degrees Celsius and thereby collecting all the dissolved grease and bigger particles. The flush tank is connected by a stainless steel pipe to a cooler element 90 for condensing the expanded $CO_2$ and thereby controlling the pressure in the tank 80. The cooler element 90 is connected by a stainless steel pipe to the flush tank 80. A carbon filter 10 is used for filtering out hydrocarbons in the gas and thereby ensuring a constant clean gas within the system. The carbon filter 100 is connected by a stainless steel pipe to a fourth expansion valve 110 for regulating the gas in the system and thereby controlling various flow options. The fourth expansion valve 110 is connected to a gas filter 120 for filtering out contaminants within the gas and thereby obtaining a sufficient level of cleanliness of the gas. The gas filter 120 is connected by a stainless steel pipe to a reservoir 130, for example for receiving the expanded gas from 70 bar to 65 bar and a temperature of 28.7 degrees Celsius to 25.5 degrees Celsius and thereby ensuring a sufficient level of gas for the compressor. The reservoir 130 is connected by a stainless steel pipe to a heater element 131 for controlling the temperature in the reservoir 130 and thereby ensuring a gas atmosphere inside the reservoir 130. The reservoir 130 is also connected to the compressor 10 for recirculation.

The flushing system 9 and pipe system 140 in this embodiment form a closed system that enables flushing of the pipe system 140.

The shown detailed embodiment and parameters disclosed are for a flushing system using $CO_2$ as a flushing fluid. However, a different flushing fluid with different supercritical values may be used, and the system adjusted accordingly.

Experiments were performed for a ¼ inch pipe with an inner diameter of 0.05 inch and a length of 145 m. The pipe was provided as new and clean from the manufacturer and provided as a coil with a diameter of approximately 0.5 m. As outlined in the introduction, these coils were pre-flushed with hydraulic oil in order to provide apparently clean tubes. However, in practice, the lumen of the tubes is not sufficiently cleaned. The fact that additional cleaning is useful was shown in the following experiment.

During the flushing, parameter values for inlet pressure, inlet and outlet temperature and flowrate were measured as well as differential pressure during flushing of SCCO2 through the tube. Pressure drop over the coil length was measured at different flow conditions. The table below states parameters from two measurements.

| $CO_2$ flow | | | $t_{in}$ | $t_{out}$ | | $dp_{meas}$ |
|---|---|---|---|---|---|---|
| kg/h | kg/m²s | m/s | ° C. | ° C. | $N_{Re}$ | Bar |
| 21 | 498 | 0.60 | 83 | 50 | 30,000 | ≈8-10 |
| 64 | 1,518 | 2.27 | 83 | 60 | 105,000 | ≈15-20 |

The temperature $t_{in}$ at the first end of the pipe and the temperature $t_{out}$ at the second end of the pipe were in the temperature region for SCCO2 and so was the pressure, which was in around 250 Bar at the first end. The low pressure drop $dp_{meas}$ from the first to the second end of the pipe is partly due to the low viscosity of SCCO2. Calculated Reynolds numbers $N_{Re}$ are indicated in the table. The pressure of above 200 Bar at the second end resulted in oil being dissolved in the SCCO2 and thus also flushed out of the lumen. As the oil was flushed out, also particles were easily removed from the walls of the lumen. During the flushing process, samples were taken from the SCCO2 and filtered. Filters showed substantial contamination from such samples. Many particles that were flushed out of the pipe were visible with the eye. During subsequent flushing cycles, filters were changed for decreasing pore size. After final flushing with a filter having a 1 micrometer pore size, it was concluded that a level of cleanliness according to standard of National Aerospace Standard (NAS) 1638 Class 4 was achieved by the SCCO2 flushing. A subsequent flushing with LCO2 as a control showed a NAS 1638 Class 2 cleanliness, which is a very high degree of cleanliness.

Due to the low pressure drop for SCCO2, the system is highly robust in the sense that it preserves stable parametric flushing conditions with respect to speed, pressure and turbulence in addition to pressure conditions for dissolved oil in the SCCO2.

For instances where a pipe is placed in sea water and cooled through the pipe wall by the sea water, the temperature may drop such that a supercritical state cannot be preserved along the entire pipe. In such case, where the CO2 changes into liquid form, variations with respect to pressure loss and speed inside the lumen would occur. However, the flushing would still be possible, although parameters would have to be adjusted. For example, the pressure loss would be higher due to the higher viscosity, and the entrance pressure would have to be chosen correspondingly higher. In order to keep the CO2 in a supercritical state for as much of the pipe length as possible, the flow speed should be adjusted relatively high.

As a conclusion, the use of SCCO2 for flushing pipes is superior to flushing with LCO2. This is partly due to the fact of the lower viscosity, because the lower viscosity allows higher flow speed at reduced pressure loss as compared to LCO2. This is advantageous economically and in practice when flushing. The reduced pressure loss, in turn, has the consequence that the pressure at the second end of even very long pipes (even several kilometers long) can be kept above 200 Bar without exceeding a safe pressure at the first end; the 200 Bar of SCCO2 being advantageous for oil dissolution and oil removal from the pipe lumen.

PARTS LIST

1 State diagram
2 Fluid
3 Solid state
4 Gas state
5 Liquid state
6 SuperCritical (SC) state
7 Flushing
8 Alternative Flushing
9 Flushing system
10 Compressor
20 Filter
30 Heater
40 First expansion valve
50 Second expansion valve
60 System of sampling filters
70 Third expansion valve
80 Flush tank
90 Cooler
100 Carbon filter
110 Fourth expansion valve
120 Reservoir filter
130 Reservoir
131 Heater element
140 Pipe system
141 Inlet point
142 Return point

The invention claimed is:

1. A method for flushing a lumen of a long, thin pipe having a first end and a second end and the lumen between the first end and second end of the pipe, which method comprises:
adding a fluid to the lumen of the pipe, the lumen having a cross sectional area of less than 100 square mm and a length of more than 500 meter;
providing the fluid in a supercritical state inside the lumen;
subsequently, as a flushing step, while the fluid is in the supercritical state or in a liquid state, displacing the fluid in the lumen of the pipe and out of lumen of the pipe at a speed that causes a turbulent flow of the fluid, thereby flushing particles out of the lumen.

2. A method according to claim 1, wherein the displacing is performed with a Reynolds number of at least 2,500 if the fluid is in the liquid state and of at least 17,000, if the fluid is in the supercritical state.

3. A method according to claim 1, wherein the displacing is performed at a speed which is at least 0.5 m/sec.

4. A method according to claim 3, wherein the fluid is CO2.

5. A method according to claim 4, wherein the cross sectional area of the lumen is less than 30 square mm, and the length more than 1000 m, the speed of the fluid through the pipe during the flushing step is at least 0.5 m/sec, and the Reynolds number is at least 2,500 if the fluid is in the liquid state and at least 17,000, if the fluid is in the supercritical state, wherein the pressure of the fluid at the first end is higher than 200 bars.

6. A method according to claim 1, wherein the method comprises filling the fluid in gas state into the lumen, bringing the fluid into a supercritical state by increasing the temperature and/or the pressure of the fluid to beyond the critical point ($T_{SC}$,$P_{SC}$) to obtain the supercritical state.

7. A method according to claim 6, wherein the flushing is performed with the fluid in the supercritical state.

8. A method for flushing a lumen of a long, thin pipe with having a first end and a second end and the lumen between the first end and the second end of the pipe, which method comprises:
adding a fluid to the lumen of the pipe, the lumen having a cross sectional area of less than 100 square mm and a length of more than 500 meter;
providing the fluid in a supercritical state inside the lumen;
subsequently, as a flushing step, while the fluid is in the supercritical state or in a liquid state, displacing the fluid in the lumen of the pipe and out of lumen of the pipe at a speed that causes a turbulent flow of the fluid, thereby flushing particles out of the lumen,
wherein the method comprises filling the fluid in gas state into the lumen, bringing the fluid into a supercritical state by increasing the temperature and/or the pressure of the fluid to beyond the critical point ($T_{SC}$,$P_{SC}$) to obtain the supercritical state,
wherein the fluid is flowing into the lumen at the first end and exits the lumen at the second end, and the fluid is recirculated through a particle filter between the second end and the first end, wherein the fluid traverses the particle filter in gas state or in supercritical state.

9. A method according to claim 8, wherein the fluid is continuously recirculated through the lumen and the filter, and the pressure of the fluid inside the lumen is alternated between a low value below the supercritical pressure and a high value above the supercritical pressure for alternating between liquid state and supercritical state of the fluid inside the lumen.

10. A method for flushing a lumen of a long, thin pipe having a first end and a second end and the lumen between the first end and second end of the pipe, which method comprises:
adding a fluid to the lumen of the pipe, the lumen having a cross sectional area of less than 100 square mm and a length of more than 500 meter;
providing the fluid in a supercritical state inside the lumen;
subsequently, as a flushing step, while the fluid is in the supercritical state or in a liquid state, displacing the fluid in the lumen of the pipe and out of lumen of the pipe at a speed that causes a turbulent flow of the fluid, thereby flushing particles out of the lumen,
further comprising providing the pipe in a liquid bath while the fluid is inside the lumen; controlling the temperature of the liquid bath to above the supercritical temperature of the fluid before the flushing and optionally during the flushing.

11. A method according to claim 1, wherein the fluid pressure in the lumen at the first end of the pipe is above 200 bar and, optionally also at the second end.

12. Use of $CO_2$ in a supercritical state for cleaning pipes having a length of more than 500 meters and a lumen with a cross sectional area of less than 100 square mm by:
providing $CO_2$ in a supercritical state inside the lumen;
subsequently, as a flushing step, while the $CO_2$ is in the supercritical state or in a liquid state, displacing the $CO_2$ in the lumen of the pipe and out of lumen of the pipe at a speed that causes a turbulent flow of the fluid, thereby flushing particles out of the lumen.

13. Use of $CO_2$ in a supercritical state for cleaning pipes having a length of more than 500 meters and a lumen with a cross sectional area of less than 100 square mm, wherein the pipe is a control line for valves in offshore petrochemical transport systems by:
adding a $CO_2$ to the lumen of the control line, the lumen having a cross sectional area of less than 100 square mm and a length of more than 500 meter;
providing the $CO_2$ in a supercritical state inside the lumen;
subsequently, as a flushing step, while the $CO_2$ is in the supercritical state or in a liquid state, displacing the $CO_2$ in the lumen of the control line and out of lumen of the control line at a speed that causes a turbulent flow of the $CO_2$, thereby flushing particles out of the lumen.

14. Use of $CO_2$ in a supercritical state for cleaning pipes having a length of more than 500 meters and a lumen with a cross sectional area of less than 100 square mm, wherein the pipe is provided as a coil prior to offshore installation by:
providing $CO_2$ in a supercritical state inside the lumen;
subsequently, as a flushing step, while the $CO_2$ is in the supercritical state or in a liquid state, displacing the $CO_2$ in the lumen of the pipe and out of lumen of the pipe at a speed that causes a turbulent flow of the fluid, thereby flushing particles out of the lumen.

15. A method according to claim 1, wherein the fluid is flowing into the lumen at the first end and exits the lumen at the second end, and the fluid is recirculated through a particle filter between the second end and the first end, and wherein the fluid traverses the particle filter in gas state or in supercritical state.

16. A method according to claim 2, wherein the displacing is performed with a Reynolds number of at least 25,000, if the fluid is in the supercritical state.

17. A method according to claim 3, wherein the displacing is performed at a speed which is at least 1.5 m/sec.

18. A method according to claim 5, wherein the speed of the fluid through the pipe during the flushing step is at least 1.5 m/sec.

19. A method according to claim 5, wherein the Reynolds number is at least 25,000 if the fluid is in the supercritical state.

* * * * *